(12) United States Patent
Zhou et al.

(10) Patent No.: US 12,155,223 B2
(45) Date of Patent: Nov. 26, 2024

(54) DETACHABLE WIRELESS CHARGER

(71) Applicant: VIVO MOBILE COMMUNICATION CO., LTD., Guangdong (CN)

(72) Inventors: Ximing Zhou, Guangdong (CN); Dong Chen, Guangdong (CN); Huabing Wei, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 498 days.

(21) Appl. No.: 17/530,340

(22) Filed: Nov. 18, 2021

(65) Prior Publication Data

US 2022/0077716 A1 Mar. 10, 2022

Related U.S. Application Data

(63) Continuation of application No. PCT/CN2020/090045, filed on May 13, 2020.

(30) Foreign Application Priority Data

May 22, 2019 (CN) .......................... 201910429016.7

(51) Int. Cl.
*H01M 10/46* (2006.01)
*H02J 7/00* (2006.01)
(Continued)

(52) U.S. Cl.
CPC ............ *H02J 50/10* (2016.02); *H02J 7/0042* (2013.01); *H02J 50/005* (2020.01); *H02J 50/402* (2020.01); *H02J 50/60* (2016.02)

(58) Field of Classification Search
CPC .......... H02J 50/005; H02J 50/10; H02J 50/60; H02J 50/402; H02J 7/0042; H02J 7/0013
(Continued)

(56) References Cited

U.S. PATENT DOCUMENTS 8,558,411 B2 * 10/2013 Baarman ................. H02J 50/90
307/104
2010/0219698 A1 * 9/2010 Azancot ................. H02J 50/12
307/104
(Continued)

FOREIGN PATENT DOCUMENTS

CN 102640379 A 8/2012
CN 206250814 U 6/2017
(Continued)

OTHER PUBLICATIONS

International Search Report of International Application No. PCT/CN2020/090045 mailed on Aug. 3, 2020.
(Continued)

*Primary Examiner* — Edward Tso
(74) *Attorney, Agent, or Firm* — IP & T GROUP LLP

(57) ABSTRACT

A wireless charger includes a base, a first transmitter, a driver circuit, a controller and an energy radiation member. The first transmitter coil is fixed in the base. The driver circuit is disposed in the base. The controller is disposed in the base and connected to the driver circuit. The energy radiation member is detachable from the base and connected to the base through a wire, and the energy radiation member comprises a second transmitter coil. In the case that the energy radiation member and the base are in a separated state, the driver circuit drives, under control of a control signal from the controller, the first transmitter coil and the second transmitter coil to operate.

9 Claims, 1 Drawing Sheet

(51) Int. Cl.
  *H02J 50/00* (2016.01)
  *H02J 50/10* (2016.01)
  *H02J 50/40* (2016.01)
  *H02J 50/60* (2016.01)

(58) Field of Classification Search
  USPC ............... 320/107, 108, 114, 115, 116, 138; 307/104
  See application file for complete search history.

(56) References Cited

U.S. PATENT DOCUMENTS

| | | |
|---|---|---|
| 2013/0241478 A1 | 9/2013 | Azancot et al. |
| 2014/0203767 A1 | 7/2014 | Wang |
| 2017/0237280 A1 | 8/2017 | Baarman et al. |

FOREIGN PATENT DOCUMENTS

| | | |
|---|---|---|
| CN | 107565665 A | 1/2018 |
| CN | 108233503 A | 6/2018 |
| CN | 207994679 U | 10/2018 |
| CN | 208433808 U | 1/2019 |
| CN | 109347187 A | 2/2019 |
| CN | 110011389 A | 7/2019 |
| EP | 3454447 A1 | 3/2019 |
| KR | 2020180001448 U | 5/2018 |

OTHER PUBLICATIONS

Written Opinion of The International Searching Authority of International Application No. PCT/CN2020/090045 mailed on Aug. 3, 2020.

First Office Action of Priority Application No. 201910429016.7 mailed on Jun. 19, 2020.

Extended European Search Report on the European Patent Application No. 20808974.8 issue by the European Patent Office on Nov. 9, 2022.

* cited by examiner

DETACHABLE WIRELESS CHARGER

CROSS-REFERENCE TO RELATED APPLICATIONS

This application is a Bypass Continuation Application of PCT/CN2020/090045 filed on May 13, 2020, which claims priority to Chinese Patent Application No. 201910429016.7 filed on May 22, 2019, which are incorporated herein by reference in their entirety.

TECHNICAL FIELD

Embodiments of the present disclosure relate to the field of wireless charger technologies, and in particular, to a wireless charger.

BACKGROUND

With continuous development and popularization of smartphones, smartphones have become an indispensable electronic product for everyone. As users frequently use smartphones, having multiple smartphones by a user is becoming a new trend. To improve the convenience of using mobile phones, a growing number of users use wireless chargers to charge mobile phones.

However, a wireless charger in the related art can charge only one mobile phone, and when multiple mobile phones of a user have insufficient power and the user urgently needs to use the mobile phone, how to implement usage of the mobile phone during charging while satisfying the user's need for charging the multiple mobile phones has become a problem needing to be urgently solved.

SUMMARY

An embodiment provides a wireless charger, including:
a base;
a first transmitter coil, where the first transmitter coil is fixed in the base;
a driver circuit, where the driver circuit is disposed in the base;
a controller, where the controller is disposed in the base and connected to the driver circuit; and
an energy radiation member, where the energy radiation member is detachable from the base and connected to the base through a wire, and the energy radiation member includes a second transmitter coil.

In the case that the energy radiation member and the base are in a separated state, the driver circuit drives, under control of a control signal of the controller, the first transmitter coil and the second transmitter coil to operate.

DESCRIPTION OF EMBODIMENTS

The following clearly describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure shall fall within the protection scope of the present disclosure.

Figure 1:
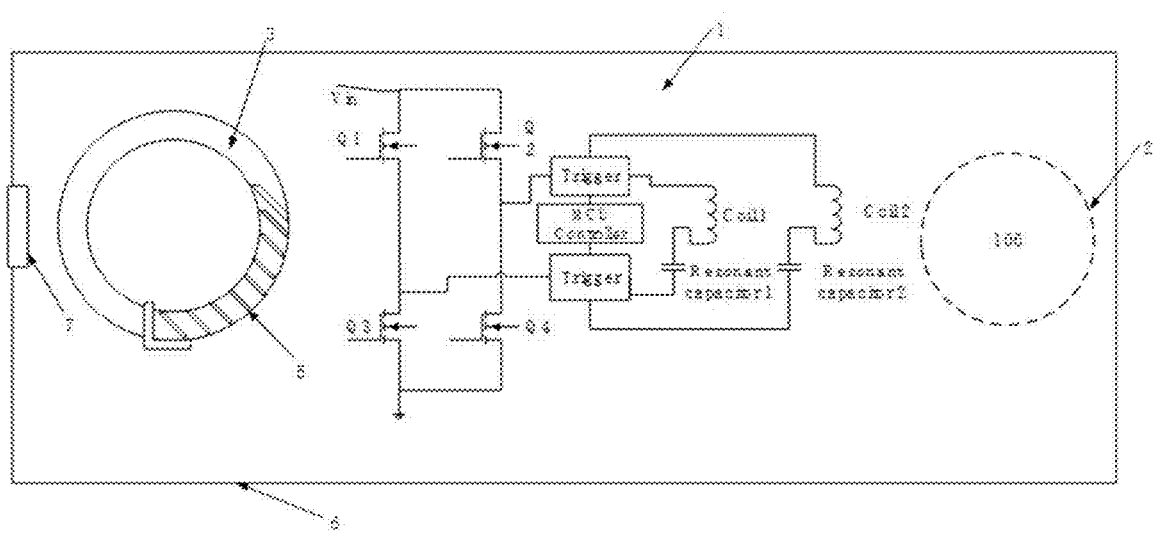
FIG. 1 is a first schematic structural diagram of a wireless charger according to an embodiment of the present disclosure.

FIG. 1 is a schematic structural diagram of a wireless charger according to an embodiment of the present disclosure. The wireless charger includes: a base 1; a first transmitter coil 2, where the first transmitter coil is fixed in the base 1; a driver circuit (not shown in the figure), where the driver circuit is disposed in the base 1; a controller (not shown in the figure), where the controller is disposed in the base 1 and connected to the driver circuit; and an energy radiation member 3, where the energy radiation member 3 is detachable from the base 1 and connected to the base 1 through a wire 4, and the energy radiation member 3 includes a second transmitter coil. In the case that the energy radiation member 3 and the base 1 are in a separated state, the driver circuit drives, under control of a control signal of the controller, the first transmitter coil 2 and the second transmitter coil to operate.

Figure 2:
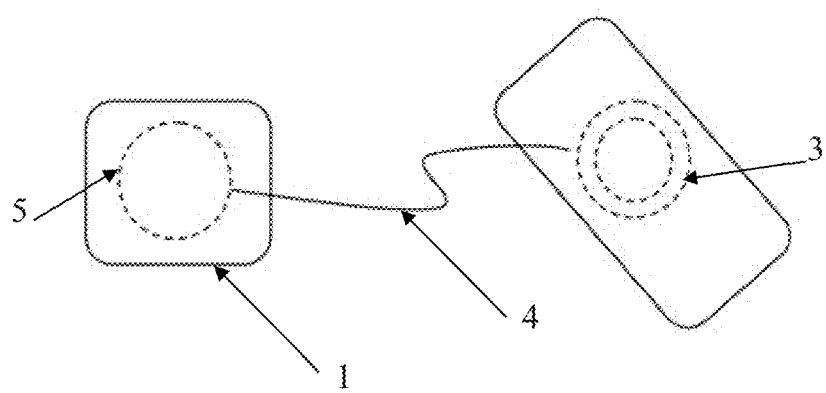
FIG. 2 is a second schematic structural diagram of a wireless charger according to an embodiment of the present disclosure.

It should be noted that the energy radiation member 3 is detachable from the base 1 and connected to the base 1 through the wire 4, which means that the energy radiation member 3 can be separated from the base 1 through the wire 4, as shown in FIG. 2. In other words, the energy radiation member 3 can be moved within an effective range of the wire 4.

It should be noted that, in the case that the energy radiation member 3 and the base 1 are in the separated state, that is, the energy radiation member 3 is moved away from a surface of the base 1 by a distance greater than a first preset distance, the driver circuit drives, under control of a control signal of the controller, the first transmitter coil and the second transmitter coil to operate. In this case, the wireless charger can charge both a first terminal placed on the energy radiation member 3 and a second terminal placed on the base 1. In addition, because the energy radiation member 3 can be moved within the effective range of the wire 4, the user can pick up the energy radiation member 3 to use the first terminal during a charging process of the first terminal. In other words, the wireless charger in this embodiment can not only meet a user's demand for using a mobile phone during charging, but also meet the user's demand for charging multiple mobile phones.

Optionally, the wireless charger further includes a trigger, where the trigger is disposed on the energy radiation member 3 or the base 1, and is connected to the controller. In the case that the energy radiation member 3 and the base 1 are in the separated state, the trigger generates a first triggering signal, and the controller outputs a first control signal to the driver circuit based on the first triggering signal, so that the driver circuit drives the first transmitter coil 2 and the second transmitter coil to operate. In the case that the energy radiation member 3 and the base 1 are in a non-separated state, the trigger generates a second triggering signal, and controller outputs a second control signal to the driver circuit based on the second triggering signal, so that the driver circuit drives the first transmitter coil 2 or the second transmitter coil to operate.

It should be noted that, in the case that the trigger is disposed on the energy radiation member 3, the trigger is electrically connected to the controller through the wire 4.

Herein, that the energy radiation member 3 and the base 1 are in the non-separated state includes: the energy radiation member 3 is located on a surface of the base 1 (as shown in FIG. 1), or a distance between the energy radiation member 3 and the base 1 is less than a second preset distance.

Herein, in the case that the energy radiation member 3 and the base 1 are in the non-separated state, the trigger generates the second triggering signal, the controller outputs the second control signal to the driver circuit based on the triggering signal, so that driver circuit drives the first transmitter coil 2 or the second transmitter coil to operate. This aims to reduce standby power consumption. Only one of the first transmitter coil 2 and the second transmitter coil operates, and charges a terminal.

Optionally, the trigger is a pressure-controlled switch; and when the pressure-controlled switch is in an open state, the energy radiation member 3 and the base 1 are in the separated state; or when the pressure-controlled switch is in a closed state, the energy radiation member 3 and the base 1 are in the non-separated state.

In an optional implementation, when pressure on the base 1 is less than a specified value of the pressure-controlled switch, an internal micro switch element can be triggered by using a sensor to be disconnected, that is, the pressure-controlled switch is in the open state. Herein, the pressure-controlled switch is in the open state, which indicates that the energy radiation member 3 is not placed on the surface of the base 1, that is, the energy radiation member 3 is not in contact with the surface of the base 1. In other words, the energy radiation member 3 and the base 1 are in the separated state.

When pressure on the base 1 is greater than a specified value of the pressure-controlled switch, an internal micro switch element can be triggered by using a sensor to be connected, that is, the pressure-controlled switch is in the closed state. Herein, the pressure-controlled switch is in the closed state, which indicates that the energy radiation member 3 is placed on the surface of the base 1, that is, the energy radiation member 3 is in contact with the surface of the base 1. In other words, the energy radiation member 3 and the base are in the non-separated state.

Optionally, the trigger is a distance sensor. When the distance sensor detects that a distance between the energy radiation member 3 and the base 1 is greater than a first preset distance, the energy radiation member 3 and the base 1 are in the separated state. When the distance sensor detects that a distance between the energy radiation member 3 and the base 1 is less than a second preset distance, the energy radiation member 3 and the base 1 are in the non-separated state.

Herein, when the distance sensor detects that the distance between the energy radiation member 3 and the base 1 is greater than the first preset distance, it indicates that the energy radiation member 3 is away from the base 1, that is, the energy radiation member 3 and the base 1 are in the separated state.

Herein, when the distance sensor detects that the distance between the energy radiation member 3 and the base 1 is less than the second preset distance, it indicates that the energy radiation member 3 is close to the base 1, that is, the energy radiation member 3 and the base 1 are in the non-separated state.

Optionally, the distance sensor is an infrared sensor.

In an optional implementation, the driver circuit includes a first driver circuit and a second driver circuit; the first driver circuit is electrically connected to the first transmitter coil 2; the second driver circuit is electrically connected to the second transmitter coil through the wire 4; and both the first driver circuit and the second driver circuit are connected to the controller.

In the case that the energy radiation member 3 and the base 1 are in the separated state, the first driver circuit drives, under control of a control signal of the controller, the first transmitter coil 2 to operate, and the second driver circuit drives, under control of a control signal of the controller, the second transmitter coil to operate.

In the case that the energy radiation member 3 and the base are in the non-separated state, the first driver circuit drives, under control of a control signal of the controller, the first transmitter coil 2 to operate, or the second driver circuit drives, under control of a control signal of the controller, the second transmitter coil to operate. In other words, the controller controls one of the driver circuits to operate, and the other driver circuit not to operate.

To facilitate storage of the wire 4 between the energy radiation member 3 and the base 1, in an optional implementation, the wireless charger in the present disclosure may further include a cable storage apparatus 5. The cable storage apparatus 5 is disposed in the base 1. The cable storage apparatus 5 includes a rotating shaft, where the wire 4 can be stretched or wound around the rotating shaft.

It should be noted that in a process of charging the terminal through the energy radiation member 3, if the user needs to move the terminal while maintaining a charging state, the user can stretch the wire 4 stored in the cable storage apparatus 5 by using rotating shaft in the cable storage apparatus 5 when picking up the energy radiation member 3. After the terminal is moved, the wire 4 in the cable storage apparatus 5 can be stretched freely, as shown in FIG. 2. In this way, the user can move the terminal within an effective range of the wire 4.

In addition, to quickly and automatically store the freely stretched wire 4 into the cable storage apparatus 5, optionally, the cable storage apparatus may further include: a motor connected to the rotating shaft and a switch. The switch is configured to control starting or stopping of the motor.

When the user moves out the terminal placed on the energy radiation member 3 to stop charging, the motor can be controlled by a switch to start, and the motor drives the rotating shaft to rotate, so that the wire 4 is wound on the rotating shaft and shrunk in the cable storage apparatus 5.

Optionally, the energy radiation member 3 further includes a housing, the second transmitter coil is fixed in the housing, and a first connecting member is disposed on a surface of the housing.

An objective of arranging the first connecting member on the surface of the housing is to securely fasten the terminal on the energy radiation member 3 when the terminal is charged through the energy radiation member 3. Herein, optionally, the first connecting member is a sucker.

It should be further noted that the sucker disposed on the surface of the housing can absorb a surface of a housing or a leather case of a terminal, such as a mobile phone, and further facilitate use of the mobile phone by the user while charging the mobile phone through the energy radiation member 3.

To facilitate the fastening or pickup of the energy radiation member 3 on the base 1, optionally, the wireless charger in the present disclosure may further include a second connecting member 6. The energy radiation member 3 is detachably connected to the base 1 through the second connecting member 6.

Optionally, the second connecting member 6 is a buckle.

As shown in FIG. 1, the second connecting member 6 may be further used as a switch for stretching and moving the wire 4. For example, when the energy radiation member 3 is fastened onto the base 1 through the second connecting member 6, the second connecting member 6 is used as a switch for stretching and moving the wire 4 and the switch is turned off, which can prevent the energy radiation member 3 from moving through the wire 4. When the energy radiation member 3 is moved away from base 1 through the second connecting member 6, the second connecting member 6 is used as a switch for stretching and moving the wire 4 and the switch is turned on, so that the wire 4 can be stretched and moved.

Optionally, the wireless charger in the present disclosure may further include a power supply circuit (not shown in the figure) disposed in the base 1, and the power supply circuit includes the driver circuit.

Optionally, the wireless charger in the present disclosure may further include a charging interface 7. The charging interface is disposed on the base, and the charging interface 7 is connected to the power supply circuit.

Herein, the charging interface 7 is configured to connect to an external adapter.

According to the wireless charger provided in the embodiments of the present disclosure, the first transmitter coil is fixed in the base, the energy radiation member is detachable from the base and connected to the base through a wire, the energy radiation member includes the second transmitter coil, and the controller is disposed in the base and connected to the driver circuit. In the case that the energy radiation member and the base are in the separated state, the driver circuit drives, under control of the control signal of the controller, the first transmitter coil and the second transmitter coil to operate. In this way, the wireless charger with the foregoing structure can not only meet a user's demand for using a mobile phone during charging, but also meet the user's demand for charging multiple mobile phones, thereby improving user experience.

The embodiments of the present disclosure are described above with reference to the accompanying drawings, but the present disclosure is not limited to the foregoing specific implementations. The foregoing specific implementations are merely illustrative but not restrictive. Under enlightenment of the present disclosure, a person of ordinary skill in the art may make many forms without departing from the principles of the present disclosure and the protection scope of the claims, all of which fall within the protection of the present disclosure.

What is claimed is:

1. A detachable wireless charger, comprising:
   a base;
   a first transmitter coil, wherein the first transmitter coil is fixed in the base;
   a driver circuit, wherein the driver circuit is disposed in the base;
   a controller, wherein the controller is disposed in the base and connected to the driver circuit; and
   an energy radiation member, wherein the energy radiation member is detachable from the base and connected to the base through a wire, and the energy radiation member comprises a second transmitter coil, wherein
   in a case that the energy radiation member and the base are in a separated state, the driver circuit drives, under control of a control signal from the controller, the first transmitter coil and the second transmitter coil to operate; and
   the detachable wireless charger further comprises:
   a trigger, wherein the trigger is disposed on the energy radiation member or the base, and is connected to the controller, wherein
   in the case that the energy radiation member and the base are in the separated state, the trigger generates a first triggering signal, and the controller outputs a first control signal to the driver circuit based on the first triggering signal, so that the driver circuit drives the first transmitter coil and the second transmitter coil to operate; or
   in the case that the energy radiation member and the base are in a non-separated state, the trigger generates a second triggering signal, and the controller outputs a second control signal to the driver circuit based on the second triggering signal, so that the driver circuit drives the first transmitter coil or the second transmitter coil to operate.

2. The detachable wireless charger according to claim 1, wherein the trigger is a pressure-controlled switch, wherein
   when the pressure-controlled switch is in an open state, the energy radiation member and the base are in the separated state; or
   when the pressure-controlled switch is in a closed state, the energy radiation member and the base are in the non-separated state.

3. The detachable wireless charger according to claim 1, wherein the trigger is a distance sensor, wherein
   when the distance sensor detects that a distance between the energy radiation member and the base is greater than a first preset distance, the energy radiation member and the base are in the separated state; or
   when the distance sensor detects that a distance between the energy radiation member and the base is less than a second preset distance, the energy radiation member and the base are in the non-separated state.

4. The detachable wireless charger according to claim 1, wherein the driver circuit comprises a first driver circuit and a second driver circuit;
   the first driver circuit is electrically connected to the first transmitter coil;
   the second driver circuit is electrically connected to the second transmitter coil through the wire; and
   both the first driver circuit and the second driver circuit are connected to the controller.

5. The detachable wireless charger according to claim 1, further comprising:
   a cable storage apparatus, wherein the cable storage apparatus is disposed in the base, and the cable storage apparatus comprises a rotating shaft, wherein
   the wire can be stretched or wound around the rotating shaft.

6. The detachable wireless charger according to claim 1, wherein the energy radiation member further comprises a housing, the second transmitter coil is fixed in the housing, and a first connecting member is disposed on a surface of the housing.

7. The detachable wireless charger according to claim 1, further comprising a second connecting member, wherein
   the energy radiation member is detachably connected to the base through the second connecting member.

8. The detachable wireless charger according to claim 1, further comprising:
   a power supply circuit, wherein the power supply circuit is disposed in the base, and the power supply circuit comprises the driver circuit.

9. The detachable wireless charger according to claim 8, further comprising:
   a charging interface, wherein the charging interface is disposed on the base, and the charging interface is connected to the power supply circuit.

\* \* \* \* \*